US011115319B2

United States Patent
Lopez et al.

(10) Patent No.: US 11,115,319 B2
(45) Date of Patent: Sep. 7, 2021

(54) USING BFD PACKETS IN A NETWORK TUNNEL ENVIRONMENT

(71) Applicant: Hewlett Packard Enterprise Development LP, Houston, TX (US)

(72) Inventors: David Corrales Lopez, San Jose (CR); Johan Martin Oviedo Paniagua, San Jose (CR); Daniel Canessa Valverde, San Jose (CR)

(73) Assignee: Hewlett Packard Enterprise Development LP, Houston, TX (US)

( * ) Notice: Subject to any disclaimer, the term of this patent is extended or adjusted under 35 U.S.C. 154(b) by 34 days.

(21) Appl. No.: 16/519,703

(22) Filed: Jul. 23, 2019

(65) Prior Publication Data
US 2021/0029024 A1 Jan. 28, 2021

(51) Int. Cl.
*H04L 12/703* (2013.01)
*H04L 12/733* (2013.01)
*H04L 12/46* (2006.01)

(52) U.S. Cl.
CPC .......... *H04L 45/28* (2013.01); *H04L 12/4633* (2013.01); *H04L 45/20* (2013.01)

(58) Field of Classification Search
None
See application file for complete search history.

(56) References Cited

U.S. PATENT DOCUMENTS

| 5,790,790 | A | * | 8/1998 | Smith | G06Q 10/10 709/206 |
| 6,192,407 | B1 | * | 2/2001 | Smith | G06F 21/606 709/229 |
| 7,561,527 | B1 | * | 7/2009 | Katz | H04L 43/50 370/241 |
| 7,746,796 | B2 | * | 6/2010 | Swallow | H04L 12/4633 370/249 |

(Continued)

FOREIGN PATENT DOCUMENTS

CN      102025562      4/2011

OTHER PUBLICATIONS

BFD Overview, (Research Paper), Nov. 13, 2018, 6 Pgs.

(Continued)

*Primary Examiner* — Gregory B Sefcheck
(74) *Attorney, Agent, or Firm* — Hewlett Packard Enterprise Patent Department

(57) ABSTRACT

Examples disclosed herein relate to a method comprising receiving requesting, at a first network device, a Bidirectional Forwarding Detection session with a second network device, determining, by the first network device, that the BFD session is for single hop data and determining, by the first network device, that the BFD session is over a network tunnel from the first network device to the second network device. The method may include initiating the BFD session between the first and second network devices, wherein the BFD session is shared between multiple clients requesting BFD sessions on a network tunnel, but is not shared not (Continued)

between tunneled and non-tunneled sessions between the multiple clients. The method may include transmitting, the single hop data to the second network device via the network tunnel, wherein the network tunnel traverses a multiple hop network path and disabling echo packets for the BFD session.

17 Claims, 5 Drawing Sheets

(56) References Cited

U.S. PATENT DOCUMENTS

| | | | | |
|---|---|---|---|---|
| 7,765,306 B2* | 7/2010 | Filsfils | ............... | H04L 45/22 |
| | | | | 709/228 |
| 8,144,601 B2* | 3/2012 | Liu | ............... | H04L 45/28 |
| | | | | 370/241.1 |
| 8,355,315 B2* | 1/2013 | Vasseur | ............... | H04L 41/0663 |
| | | | | 370/217 |
| 8,531,976 B2* | 9/2013 | Vasseur | ............... | H04L 41/0677 |
| | | | | 370/248 |
| 8,817,596 B2* | 8/2014 | Chen | ............... | H04L 45/22 |
| | | | | 370/221 |
| 8,885,484 B2 | 11/2014 | Birajdar et al. | | |
| 8,902,780 B1* | 12/2014 | Hegde | ............... | H04L 43/0811 |
| | | | | 370/252 |
| 9,071,514 B1* | 6/2015 | Hegde | ............... | H04L 43/0811 |
| 9,331,923 B2* | 5/2016 | Li | ............... | H04L 41/0677 |
| 9,407,526 B1* | 8/2016 | Addepalli | ............... | H04L 43/08 |
| 9,614,906 B1* | 4/2017 | Hegde | ............... | H04L 45/50 |
| 9,686,127 B2* | 6/2017 | Ramachandran | ....... | H04L 47/24 |
| 9,742,626 B2* | 8/2017 | Ramachandran | ....... | H04L 47/32 |
| 10,218,592 B2* | 2/2019 | Wang | ............... | H04L 45/22 |
| 10,237,120 B2* | 3/2019 | Patel | ............... | H04L 43/0811 |
| 10,637,781 B2* | 4/2020 | Sharma | ............... | H04L 47/12 |
| 2008/0008168 A1* | 1/2008 | Nadeau | ............... | H04L 69/22 |
| | | | | 370/389 |
| 2008/0080507 A1* | 4/2008 | Swallow | ............... | H04L 43/50 |
| | | | | 370/392 |
| 2008/0123521 A1* | 5/2008 | Vasseur | ............... | H04L 41/0663 |
| | | | | 370/217 |
| 2008/0195733 A1* | 8/2008 | Detienne | ............... | H04L 12/4633 |
| | | | | 709/224 |
| 2009/0010171 A1* | 1/2009 | Gupta | ............... | H04L 41/0631 |
| | | | | 370/244 |
| 2013/0229922 A1* | 9/2013 | Li | ............... | H04L 43/0823 |
| | | | | 370/242 |
| 2016/0080211 A1 | 3/2016 | Anand et al. | | |
| 2016/0080502 A1* | 3/2016 | Yadav | ............... | H04L 47/22 |
| | | | | 709/227 |
| 2016/0211989 A1 | 7/2016 | Jain et al. | | |
| 2020/0106701 A1* | 4/2020 | Hu | ............... | H04L 45/507 |
| 2020/0322383 A1* | 10/2020 | Filsfils | ............... | H04L 63/166 |

OTHER PUBLICATIONS

Implementing BFD, (Research Paper), Retrieved Mar. 1, 2019, 74 Pgs.

Junos OS Release Notes for MX Series 5g Universal Routing Platform, (Research Paper), Jan. 10, 2019, 60 Pgs.

* cited by examiner

USING BFD PACKETS IN A NETWORK TUNNEL ENVIRONMENT

BACKGROUND

A network tunnel is a mechanism that allows for the movement of data from one network to another. Tunneling typically involves transmitting private network communications across a non-private network, such as the Internet.

BRIEF DESCRIPTION OF THE DRAWINGS

Some implementations of the present disclosure are described with respect to the following figures.

Figure 1:
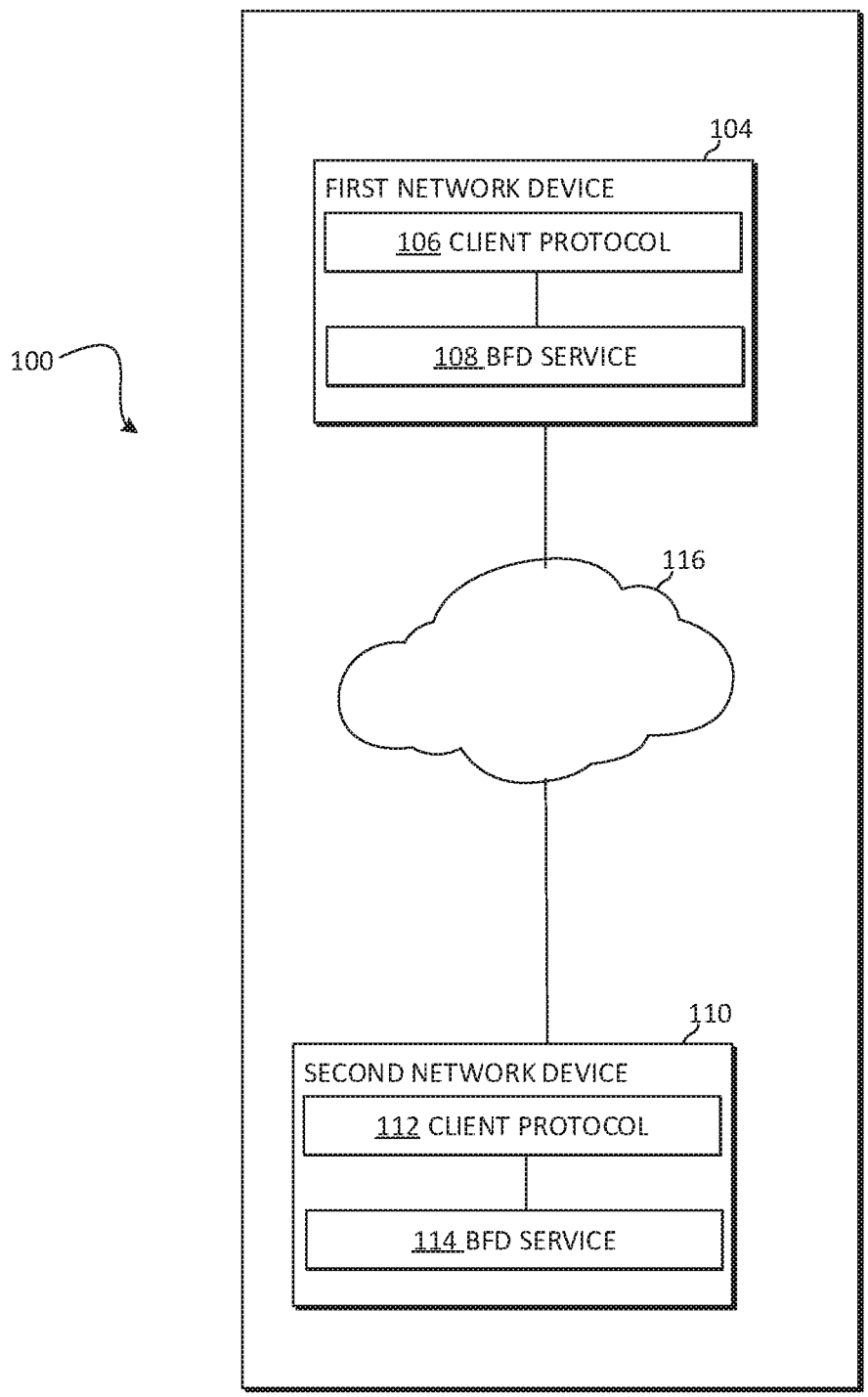
FIG. 1 is a block diagram of an example system for using BFD packets in a network tunnel environment.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A network tunnel may connect two end points (such as network devices). The end points may be separate by a single hop (when the two end points are directly connected or multiple hops, or "multi-hop," (when there are additional networks, network devices, etc.) between the two end points. A tunnel may create a virtual single hop connection between two end points that are physically located multiple hops away from each other.

A hop is one portion of the path between a source of data and its destination. As data packets are routed from their source to a destination, the data packet may pass through a variety of network devices. Each time packets are routed to the next network device, a hop occurs. A Time-to-live (TTL) value, which measures the number of hops, may be decremented by one each time a hop occurs.

Bidirectional Forwarding Detection (BFD) is a network protocol that may be used to detect faults between two network devices, such as network switches connected by a link. It provides detection of faults even on physical media that doesn't support failure detection of any kind, such as Ethernet, virtual circuits, tunnels and MPLS Label Switched Paths.

It may be beneficial to run BFD on top of a network tunnel for a variety of benefits, such as a mechanism to determine if the tunnel is healthy since tunnel technologies typically have slow detection times. However, there may be a variety of issues in using a BFD session over a network tunnel in this manner. For example, a multi-hop BFD implementation may require that BFD sessions between two endpoints would be running alongside the tunnel connected the endpoints, not inside it. This may further require that each device between the two end points to open up and/or configure certain ports, properly route the traffic, etc. Accordingly, this solution may not be practical for transmitting data between two endpoints connected by certain networks, such as, for example, the internet. Additionally, there may be issues caused by enabling a single hop BFD mechanism to run on top of a multi-hop tunnel because of additional requirements of intermediary devices.

A method for supporting BFD packets in a network tunnel environment may include requesting, at a first network device, a Bidirectional Forwarding Detection (BFD) session with a second network device and determining, by the first network device, that the BFD session is for single hop data. The method may also include determining, by the first network device, that the BFD session is over a network tunnel from the first network device to the second network device and initiating the BFD session between the first and second network devices, wherein the BFD session is shared between multiple clients requesting BFD sessions on a network tunnel, but is not shared not between tunneled and non-tunneled sessions between the multiple clients. The method may also include transmitting, the single hop data to the second network device via the network tunnel, wherein the network tunnel traverses a multiple hop network path and disabling echo packets for the BFD session.

FIG. 1 is a block diagram of an example system 100 where using BFD packets in a network tunnel environment may be useful. The system 100 may include a first network device 104. The first network device may include a client protocol 106 and a BFD service 108. The client protocol 106 may be used to exchange and coordinate information between devices (ex. OSPF, BGP, VRRP, etc.). The BFD service may be used to monitor the L3 link between to a second network device 110. The system 100 may also include a second network device 110 having a client protocol 112 and a BFD service 114. Client protocol 112 and BFD service 114 may be similar to client protocol 106 and BFD service 108, respectively. The first network device 104 may be part of a first local area network in a first physical location. The second network device 110 may be part of a second local area network in a second physical location, separate from the first physical location. The first network device 104 and the second network device 110 may be connected via a third network 116. The third network may be a public network, such as the internet, and span a variety of physical locations between the first physical location and the second physical location. There may be a variety of hops between the first network device 104 and the second network device 110. Accordingly, in some aspects the first network device 104 and the second network device 110 are separated by a single hop and in some aspects, they may be separated by multiple hops. The first network device 104 and the second network device 110 may be connected via a network tunnel. The network tunnel may be used to traverse the physically multiple hop distance between the first network device 104 and the second network device 110 via one virtual hop.

Network devices 104 and 110 may be any number of network devices, as described above. For example, devices 104 and 110 may be network switches. A network device may be a device within a network that forwards data sent by a sender device toward a recipient device (or multiple recipient devices). In some examples, a network device includes a layer 2 switch that forwards data packets (also referred to as data frames or data units) based on layer 2 addresses in the data packets. Examples of layer 2 addresses include Medium Access Control (MAC) addresses. In alternative examples, a switch includes a layer 3 router that forwards data packets based on layer 3 addresses, such as Internet Protocol (IP) addresses in the data packets.

A "packet" or "data packet" can refer to any unit of data that can be conveyed over a network. A packet or data packet may also refer to a frame or data frame, a data unit, a protocol data unit, and so forth. A switch forwards data (in data packets) between a sender device and a recipient device (or multiple recipient devices) based on forwarding information (or equivalently, "routing information") accessible by the switch. The forwarding information can include entries that map network addresses (e.g., MAC addresses or IP addresses) and/or ports to respective network paths toward the recipient device(s).

As described above, Bidirectional Forwarding Detection (BFD) is a detection protocol that may be used to detect faults between two network devices acting as forwarding engines, such as network switches connected by a link.

In some environments, BFD is run for link failure detection when routing protocols are run between these devices. When the BFD Echo function is active, a stream of BFD Echo packets is transmitted in such a way as to have the other system loop them back through its forwarding path. If a number of packets of the echoed data stream are not received, the session is declared to be down. The key point is that the BFD echo leverages the forwarding path on the neighbor to get the echo packet returned to itself without waiting for an interrupt and special handling by the CPU. An echo packet is sent with the destination IP address as self IP address and destination Router-MAC address as the Router-MAC address of the peer to which BFD session is established.

Tunneling is a process by which network communications are channeled between two devices. A link may be created between the two devices and data may be encapsulated at one device before sending to the other. Since traffic will travel within the tunnel, the TTL will remain unmodified and thus will not be discarded. In a BFD environment, a BFD single-hop packet may be required to have a certain TTL or the packet will be dropped. In some aspects, BFD single hop packets are required to have a TTL of 255.

Figure 2:
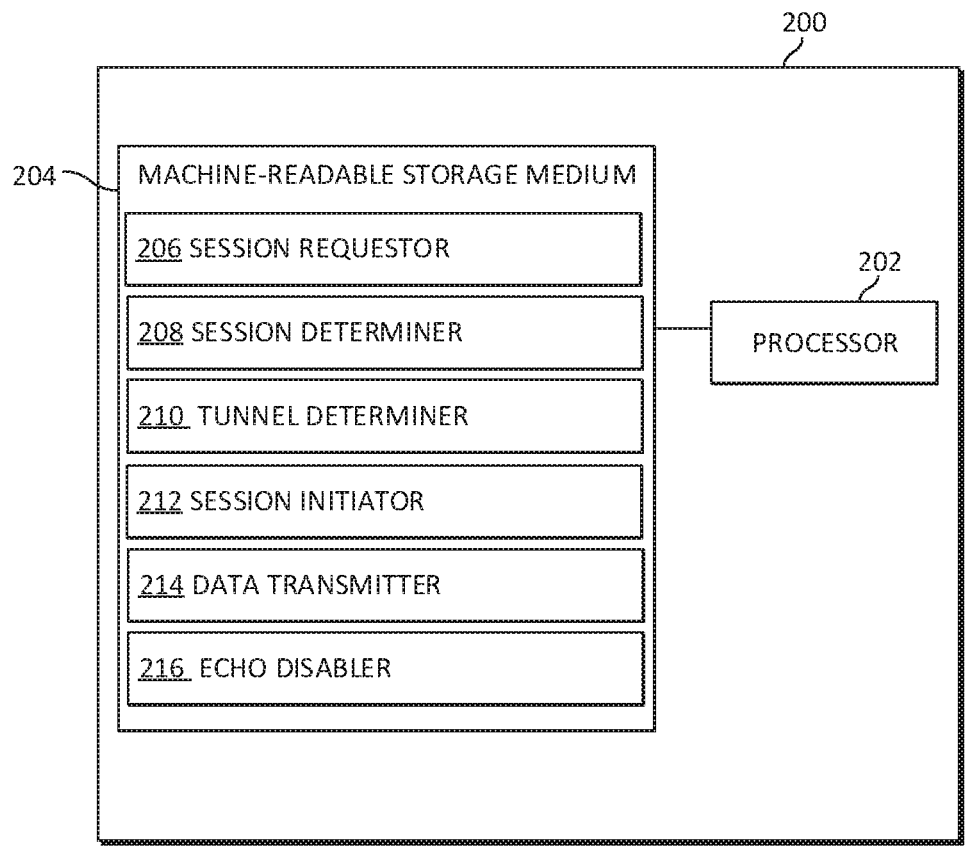
FIG. 2 is a block diagram of another example system for using BFD packets in a network tunnel environment.

A variety of mechanisms may be used to enable a BFD session in a network tunnel. Turning now to FIG. 2, a block diagram of another example system 200 for using BFD packets in a network tunnel environment is presented.

System 200 may include a first device with a processor 202 and a machine-readable storage medium 204 that may be coupled to each other through a communication link (e.g., a bus). First device may be similar to the first network device 104 and/or second network device 110 described in FIG. 1.

Processor 202 may include a single or multiple Central Processing Units (CPU) or another suitable hardware processor(s), such as a network ASIC. Machine-readable storage medium 204 may store machine readable instructions may executed by processor 202. Machine-readable storage medium 204 may include any suitable combination of volatile and/or non-volatile memory, such as combinations of Random Access Memory (RAM), Read-Only Memory (ROM), flash memory, and/or other suitable memory.

Machine-readable storage medium 204 stores instructions to be executed by processor 202 including instructions for session requestor 206, session determiner 208, tunnel determiner 210, session initiator 212, data transmitter 214, echo disabler 216 and/or other components. According to various implementations, system 200 may be implemented in hardware and/or a combination of hardware and programming that configures hardware. Furthermore, in FIG. 2 and other Figures described herein, different numbers of components or entities than depicted may be used.

Processor 202 may execute session requestor 206 to request, at a first network device, a Bidirectional Forwarding Detection (BFD) session with a second network device.

Processor 202 may execute session determiner 208 to determine, by the first network device, that the BFD session is for single hop data.

Processor 202 may execute tunnel determiner 210 to determine, by the first network device, that the BFD session is over a network tunnel from the first network device to the second network device. Determining whether the second device is reachable through a tunnel may include checking the routing table and determining if the next-hop to the remote endpoint is through a tunnel. Determining whether the second device is reachable through a tunnel may alternatively or additionally include identifying an operating mode type of the connection between the first and second device. The network tunnel may be, for example, over one of a layer 2 tunnel or a layer 3 tunnel.

Processor 202 may execute session initiator 212 to initiate the BFD session between the first and second network devices. The BFD session may be shared between multiple clients requesting BFD sessions on a network tunnel, but may not be not shared not between tunneled and non-tunneled sessions between the multiple clients.

Sessions may be shared between multiple clients requesting BFD sessions on a tunnel, but not between tunnels and non-tunneled sessions. This may be implemented by using a BFD session key. The BFD session key may include an operating mode of the BFD session as well as additional information. For each BFD session key, at most one BFD session is maintained and its results are shared with all corresponding sessions. A corresponding session refers to sessions which share a same session key.

In other words, there is a single, in-memory/CPU BFD session active, whenever multiple network protocols are monitoring the same L3 path. It also means that the multiple network protocols will obtain the same session state information (ex. OSPF, VRRP, BGP).

However, the same next-hop resolution results may be shared between tunneled and non-tunneled sessions. For BFD to start a session, it requires resolving its next-hop L2/L3 details (i.e. Distributed Media Access Control (DMAC), L3 next-hop interface). When establishing a non-tunneled session, the BFD service will request this data to be resolved. For example, when starting a BFD session between two devices with IP addresses 1.1.1.1 and 2.2.2.2 respectively, the DMAC for the next L2 hop and an outgoing interface to reach the device has to be resolved.

If a new BFD session is added, which is meant to monitor a tunnel going from two loopback interfaces and the underlay IPs are 1.1.1.1 and 2.2.2.2 respectively, then the DMAC for the next L2 hop and outgoing interface will be the same. Accordingly, so it can be shared between the non-tunneled and tunneled BFD sessions, thus saving resources.

Processor 202 may also execute session initiator 212 initiate no more than one BFD session in memory for each BFD session key whenever multiple protocols are monitoring a same layer 3 network path.

Processor 202 may execute data transmitter 214 to transmit, the single hop data to the second network device via the network tunnel. The network tunnel may traverse a multiple hop network path. The first network device may be part of a first physical Local Area Network (LAN), the second network device may be part of a second physical Local Area Network (LAN) and a portion of the multiple hop path may not belong to either of the first physical LAN or the second physical LAN.

Processor 202 may also execute data transmitter 214 to transmit a next hop resolution result between the BFD session and a non-tunneled BFD session, the next hop resolution result defining a next hop and an outgoing interface on a network path between the first and second network devices.

Processor 202 may also execute data transmitter 214 to transmit a data packet from the first network device to the second network device over the BFD session to determine that the network tunnel is active.

Processor 202 may execute echo disabler 216 to disable echo packets for the BFD session. This may be done by configuring a forwarding plane ASIC to not transmit or received BFD echo packets.

In some aspects, processor 202 may also execute a domain enforcer (not illustrated) to enforce single hop semantics across multiple hop domains. In other words, the system 200 may maintain the single-hop semantics across multi-hop L3 domains. As part of this enforcement, session information, statistics, etc. may be provided to regular single-hop, non-tunneled sessions. This may be done by dropping single-hop packets with TTL<255, even if they were tunneled. TTL>=254 may be allowed under certain circumstances if certain modes are enabled, such as for example certain virtual Active Forwarding modes.

In some aspects, two or more network devices may be connected and presented to the user as a single virtualized network device. One of the network devices may be a primary network device and the other network device may be a peer device. In the event that the first network device goes down, no traffic may be lost, although the total amount of bandwidth available to the system may be reduced. Moreover, this architecture may provide the ability to configure one network device and have the configuration synced to the network device. This keeps the network facing elements consistent across management changes to allow for load balancing and high availability in case of failure. A virtualized network device environment may use an active forwarding mode. In an active forwarding mode, some or all data packets received at one network device in the environment may be routed to other network devices in the environment. Routing is the process of transmitting the packets from one device to another on different L3 networks. In contrast, forwarding is the process of transmitting the packets between devices on the same L2/L3 network. However, routing a data packet may cause a hop counter to be altered.

Figure 3:
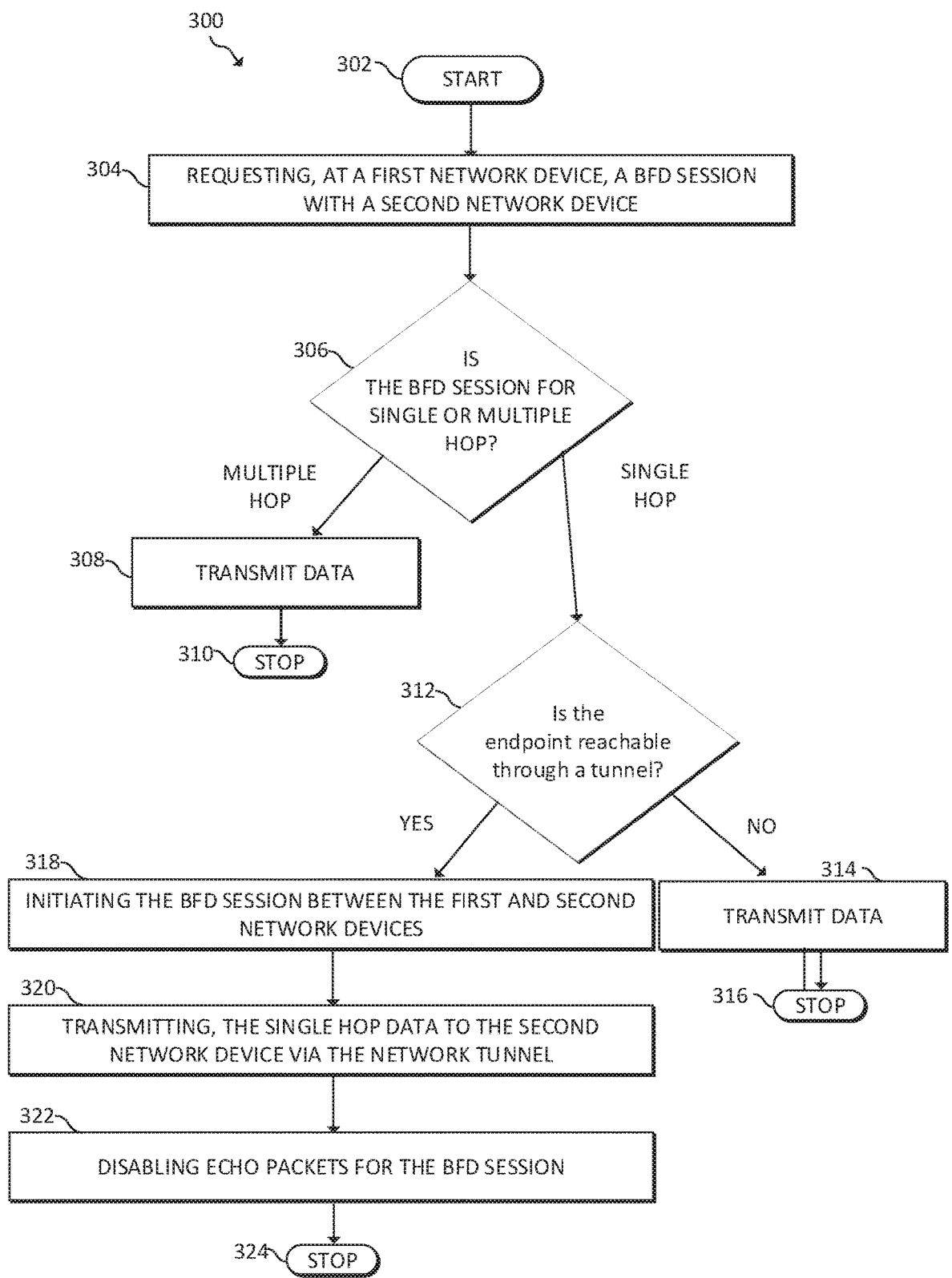
FIG. 3 is a flow diagram of an example method for transmitting BFD packets in a network tunnel environment.

FIG. 3 is a flow diagram of a method 300 for using BFD packets in a network tunnel environment. The virtualized device deployment may have a similar topology to system 100 described above. Accordingly, parts of and/or the entire method may be performed by one or more of the devices 104, 106, 110 and 112 of system 100.

The method 300 may begin at block 302 and proceed to block 304 where the method may include requesting, at a first network device, a BFD session with a second network device. Although for the purposes of explanation, the method 300 will be described from the perspective of the first network device, the first and/or the second device can initiate a BFD session independently. Accordingly, parts of or the entire method 300 may be performed by the first and/or the second device. In some aspects, the methods may be performed by both the first device and second device simultaneously or near simultaneously. When created, the BFD session will start transmitting packets (via a network tunnel or not, depending on the remote endpoint). Once a given BFD Service on the first device starts receiving packets from the second device, a BFD session handshake may occur.

At block 306, the method may include determining whether the BFD session is for a single hop or multiple hops. If it is determined that the BFD session is for multiple hops, (MULTIPLE HOP branch of block 306), the method may proceed to block 308, where the method may include transmitting data from the first device to the second device over the multiple hop path. The BFD multiple hop packets may be transmitted directly on the L3 port. Echo packets may not be supported for the BFD multiple hop packets. The method may proceed to block 310, where the method may end.

If it is determined that the BFD session is for a single hop, (SINGLE HOP branch of block 306), the method may proceed to block 312, where the method may include determining whether the endpoint (i.e. second network device) is reachable through a tunnel. If it is determined that the endpoint is not reachable through a tunnel (NO branch of block 312), the method may proceed to block 314, where the method may include transmitting data from the first device to the second device over the single hop path. Because the BFD session is for a single hop, any routing operation on the BFD packet will result in the remote BFD service dropping it, as the TTL of the session will decrease. The method may proceed to block 316, where the method may end.

If it is determined that the endpoint is reachable through a tunnel (YES branch of block 312), the method may proceed to block 318, where the method may include initiating the BFD session between the first and second network devices. At block 320, the method may include transmitting, the single hop data to the second network device via the network tunnel. By using the tunnel, the BFD packets are seen as a single-hop to the BFD service, although they traverse a (most-likely) multi-hop underlay L3 path. At block 322, the method may include disabling echo packets for the BFD session. Echoes may not be sent via tunnels, even if enabled on the tunnel endpoint interface. The method may proceed to block 324, where the method may end.

Figure 4:
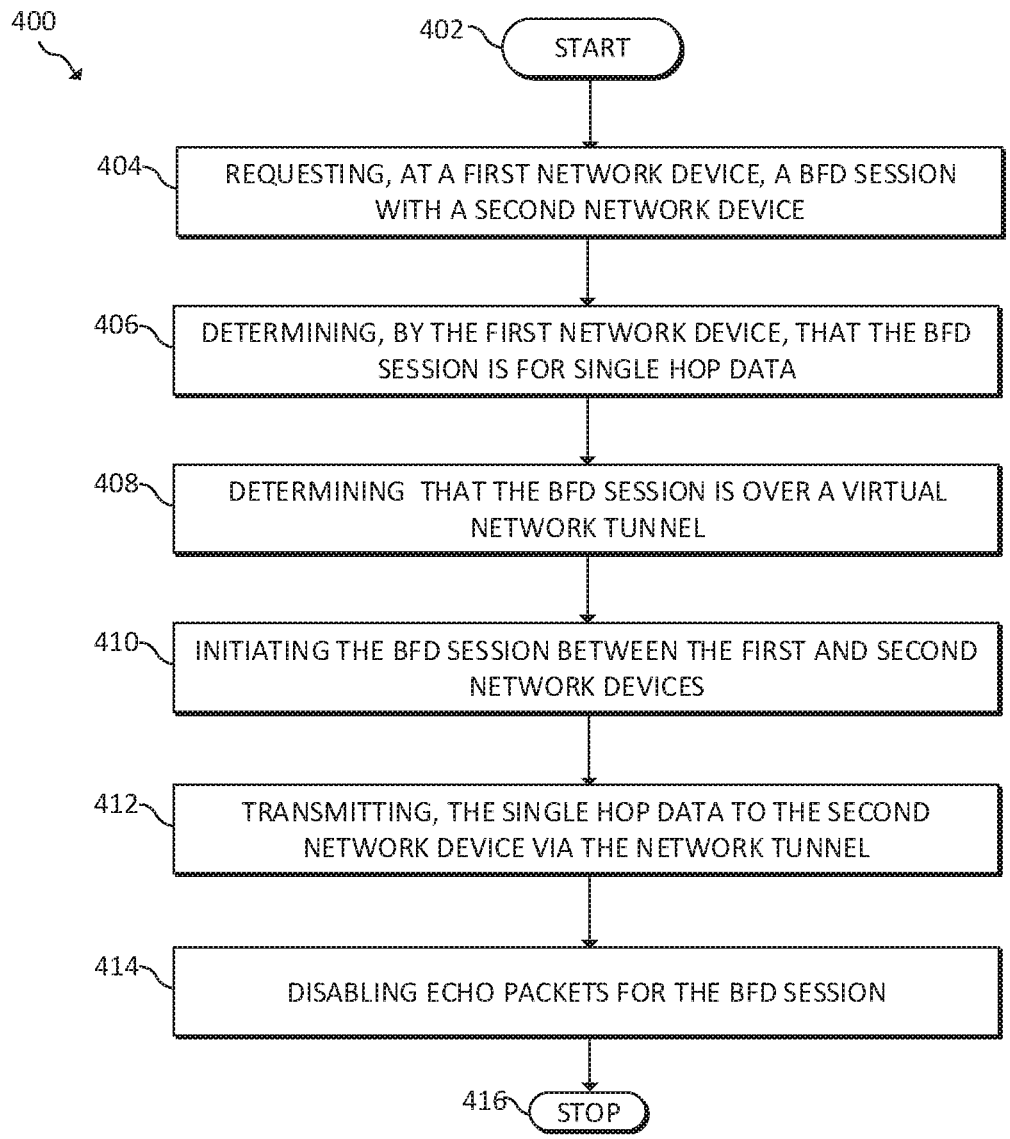
FIG. 4 is a flow diagram of an example method for transmitting BFD packets in a network tunnel environment.

FIG. 4 is a flow diagram for an example method 400 for using BFD packets in a network tunnel environment. Parts of and/or the entire method may be performed by one or more of the devices 104 and/or 110 of system 100.

The method may begin at block 402 and may proceed to block 404 where the method may include requesting, at a first network device, a Bidirectional Forwarding Detection (BFD) session with a second network device. At block 406, the method may include determining, by the first network device, that the BFD session is for single hop data. At block 408, the method may include determining, by the first network device, that the BFD session is over a network tunnel from the first network device to the second network device. The first network device may be part of a first physical Local Area Network (LAN), the second network device may be part of a second physical Local Area Network (LAN) and a portion of the multiple hop path does may not belong to either of the first physical LAN or the second physical LAN. The network tunnel may be over one of a layer 2 tunnel or a layer 3 tunnel.

At block 410, the method may include initiating the BFD session between the first and second network devices. The BFD session may be shared between multiple clients requesting BFD sessions on a network tunnel, but not shared between tunneled and non-tunneled sessions between the multiple clients. In some aspects, no more than one BFD session may be initiated in memory for each BFD session key whenever multiple protocols are monitoring a same layer 3 network path, wherein the BFD session has a corresponding BFD session key.

At block 412, the method may include transmitting, the single hop data to the second network device via the network tunnel, wherein the network tunnel traverses a multiple hop network path. In some aspects, a data packet may be transmitted from the first network device to the second network device over the BFD session to determine that the network tunnel is active. In some aspects, a next hop resolution result may be transmitted between the BFD session and a non-tunneled BFD session, the next hop resolution result defining a next hop and an outgoing interface on a network path between the first and second network devices.

At block 414, the method may include disabling echo packets for the BFD session. In some aspects, single hop semantics may be enforced over multiple hop domains. The method may proceed to block 416, where the method may end.

Figure 5:
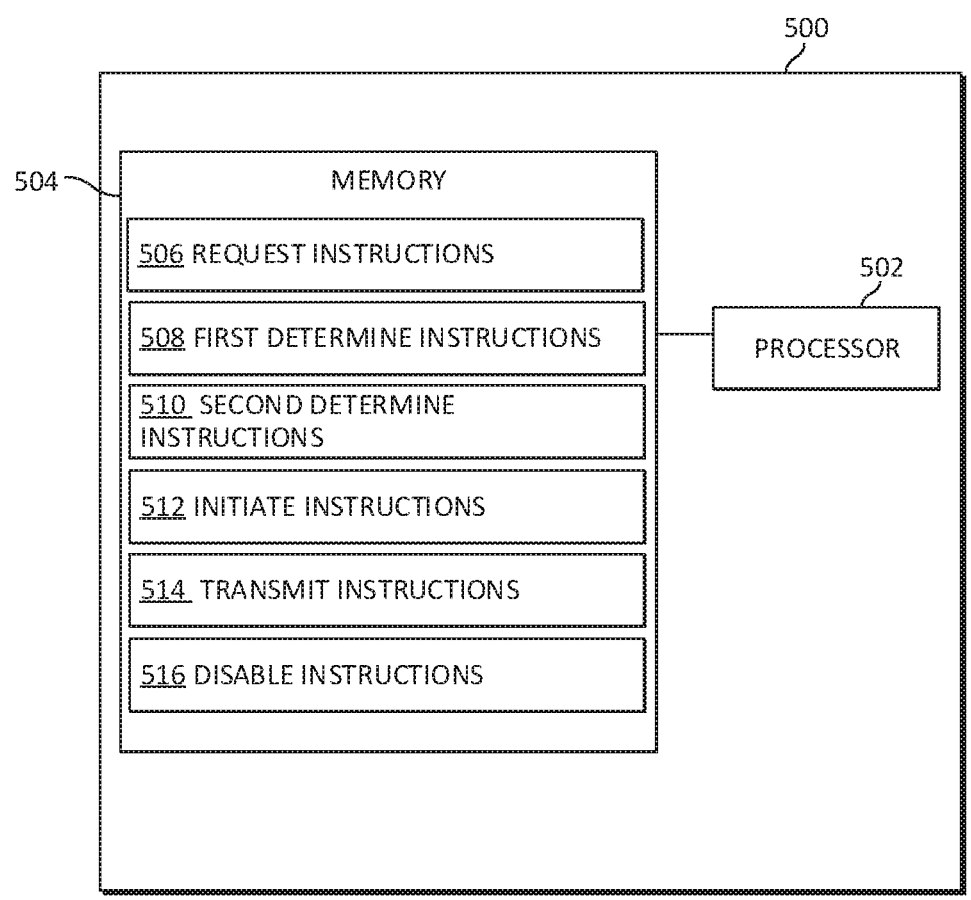
FIG. 5 is a block diagram of an example storage medium storing machine-readable instructions using BFD packets in a network tunnel environment.

FIG. 5 is a block diagram of an example system 500 for using BFD packets in a network tunnel environment. In the example illustrated in FIG. 5, system 500 includes a processor 502 and a machine-readable storage medium 504. In some aspects, processor 502 and machine-readable storage medium 504 may be part of an Application-specific integrated circuit (ASIC). Although the following descriptions refer to a single processor and a single machine-readable storage medium, the descriptions may also apply to a system with multiple processors and multiple machine-readable storage mediums. In such examples, the instructions may be distributed (e.g., stored) across multiple machine-readable storage mediums and the instructions may be distributed (e.g., executed by) across multiple processors.

Processor 502 may be at least one central processing unit (CPU), microprocessor, and/or other hardware devices suitable for retrieval and execution of instructions stored in machine-readable storage medium 504. In the example illustrated in FIG. 5, processor 502 may fetch, decode, and execute instructions 506, 508, 510, 512, 514 and 516. Processor 502 may include at least one electronic circuit comprising a number of electronic components for performing the functionality of at least one of the instructions in machine-readable storage medium 504. With respect to the executable instruction representations (e.g., boxes) described and shown herein, it should be understood that part or all of the executable instructions and/or electronic circuits included within one box may be included in a different box shown in the figures or in a different box not shown.

Machine-readable storage medium 504 may be any electronic, magnetic, optical, or other physical storage device that stores executable instructions. Thus, machine-readable storage medium 504 may be, for example, Random Access Memory (RAM), an Electrically-Erasable Programmable Read-Only Memory (EEPROM), a storage drive, an optical disc, and the like. Machine-readable storage medium 504 may be disposed within system 500, as shown in FIG. 5. In this situation, the executable instructions may be "installed" on the system 500. Machine-readable storage medium 504 may be a portable, external or remote storage medium, for example, that allows system 500 to download the instructions from the portable/external/remote storage medium. In this situation, the executable instructions may be part of an "installation package". As described herein, machine-readable storage medium 504 may be encoded with executable instructions for context aware data backup. The machine-readable storage medium may be non-transitory.

Referring to FIG. 5, request instructions 506, when executed by a processor (e.g., 502), may cause system 500 to request, at a first network device, a Bidirectional Forwarding Detection (BFD) session with a second network device.

First determine instructions 508, when executed by a processor (e.g., 502), may cause system 500 to determine, by the first network device, that the BFD session is for single hop data.

Second determine instructions 510, when executed by a processor (e.g., 502), may cause system 500 to determine, by the first network device, that the BFD session is over a network tunnel from the first network device to the second network device. The first network device may be part of a first physical Local Area Network (LAN), the second network device may be part of a second physical Local Area Network (LAN) and a portion of the multiple hop path may not belong to either of the first physical LAN or the second physical LAN. The network tunnel may be over one of a layer 2 tunnel or a layer 3 tunnel.

Initiate instructions 512, when executed by a processor (e.g., 502), may cause system 500 to initiate the BFD session between the first and second network devices. The BFD session may be shared between multiple clients requesting BFD sessions on a network tunnel, but not shared between tunneled and non-tunneled sessions between the multiple clients. In some aspects, initiate instructions 512, when executed by a processor (e.g., 502), may cause system 500 to initiate no more than one BFD session in memory for each BFD session key whenever multiple protocols are monitoring a same layer 3 network path, wherein the BFD session has a corresponding BFD session key.

Transmit instructions 514, when executed by a processor (e.g., 502), may cause system 500 to transmit, the single hop data to the second network device via the network tunnel, wherein the network tunnel traverses a multiple hop network path. In some aspects, transmit instructions 514, when executed by a processor (e.g., 502), may cause system 500 to transmit a data packet from the first network device to the second network device over the BFD session to determine that the network tunnel is active. In some aspects, transmit instructions 514, when executed by a processor (e.g., 502), may cause system 500 to transmit a next hop resolution result between the BFD session and a non-tunneled BFD session, the next hope resolution result defining a next hop and an outgoing interface on a network path between the first and second network devices.

Disable instructions 516, when executed by a processor (e.g., 502), may cause system 500 to disable echo packets for the BFD session. In some aspects, single hop semantics may be enforced over multiple hop domains.

The foregoing disclosure describes a number of examples for using BFD packets in a network tunnel environment. The disclosed examples may include systems, devices, computer-readable storage media, and methods for using BFD packets in a network tunnel environment. For purposes of explanation, certain examples are described with reference to the components illustrated in FIGS. 1-5. The content type of the illustrated components may overlap, however, and may be present in a fewer or greater number of elements and components. Further, all or part of the content type of illustrated elements may co-exist or be distributed among several geographically dispersed locations. Further, the disclosed examples may be implemented in various environments and are not limited to the illustrated examples.

Further, the sequence of operations described in connection with FIGS. 1-5 are examples and are not intended to be limiting. Additional or fewer operations or combinations of operations may be used or may vary without departing from the scope of the disclosed examples. Furthermore, implementations consistent with the disclosed examples need not perform the sequence of operations in any particular order. Thus, the present disclosure merely sets forth possible examples of implementations, and many variations and modifications may be made to the described examples.

The invention claimed is:

1. A method comprising:
   requesting, at a first network device, a Bidirectional Forwarding Detection (BFD) session with a second network device, wherein the BFD session has a corresponding BFD session key;
   determining, by the first network device, that the BFD session is for single hop data;
   determining, by the first network device, that the BFD session is over a network tunnel from the first network device to the second network device;
   initiating the BFD session between the first and second network devices, wherein the BFD session is shared between multiple clients requesting BFD sessions on a network tunnel, but is not shared between tunneled and non-tunneled sessions between the multiple clients;
   initiating no more than one BFD session in memory for each BFD session key whenever multiple protocols are monitoring a same layer 3 network path;
   transmitting, the single hop data to the second network device via the network tunnel, wherein the network tunnel traverses a multiple hop network path; and
   disabling echo packets for the BFD session.

2. The method of claim 1, wherein the first network device is part of a first physical Local Area Network (LAN), the second network device is part of a second physical Local Area Network (LAN) and the a portion of the multiple hop path does not belong to either of the first physical LAN or the second physical LAN.

3. The method of claim 1, wherein the network tunnel is over one of a layer 2 tunnel or a layer 3 tunnel.

4. The method of claim 1, comprising:
   enforcing single hop semantics across multiple hop domains.

5. The method of claim 1 comprising:
   transmitting a next hop resolution result between the BFD session and a non-tunneled BFD session, the next hope resolution result defining a next hop and an outgoing interface on a network path between the first and second network devices.

6. The method of claim 1 comprising:
   transmitting a data packet from the first network device to the second network device over the BFD session to determine that the network tunnel is active.

7. A non-transitory computer-readable storage medium encoded with instructions, the instructions executable by a processor of a system to cause the system to:
   request, at a first network device, a Bidirectional Forwarding Detection (BFD) session with a second network device, wherein the BFD session has a corresponding BFD session key;
   determine, by the first network device, that the BFD session is for single hop data;
   determine, by the first network device, that the BFD session is over a network tunnel from the first network device to the second network device;
   initiate the BFD session between the first and second network devices, wherein the BFD session is shared between multiple clients requesting BFD sessions on a network tunnel, but is not shared between tunneled and non-tunneled sessions between the multiple clients;
   initiate no more than one BFD session in memory for each BFD session key whenever multiple protocols are monitoring a same layer 3 network path, wherein the BFD session has a corresponding BFD session key;
   transmit, the single hop data to the second network device via the network tunnel, wherein the network tunnel traverses a multiple hop network path; and
   disable echo packets for the BFD session.

8. The non-transitory computer-readable storage medium of claim 7, wherein the first network device is part of a first physical Local Area Network (LAN), the second network device is part of a second physical Local Area Network (LAN) and the a portion of the multiple hop path does not belong to either of the first physical LAN or the second physical LAN.

9. The non-transitory computer-readable storage medium of claim 7, wherein the instructions executable by the processor cause the system to:
   enforce single hop semantics across multiple hop domains.

10. The non-transitory computer-readable storage medium of claim 7, wherein the instructions executable by the processor cause the system to:
    transmit a next hop resolution result between the BFD session and a non-tunneled BFD session, the next hope resolution result defining a next hop and an outgoing interface on a network path between the first and second network devices.

11. The non-transitory computer-readable storage medium of claim 7, wherein the
    instructions executable by the processor cause the system to:
    transmit a data packet from the first network device to the second network device over the BFD session to determine that the network tunnel is active.

12. A system comprising:
    a session requestor to request, at a first network device, a Bidirectional Forwarding Detection (BFD) session with a second network device, wherein the BFD session has a corresponding BFD session key;
    a session determiner to determine, by the first network device, that the BFD session is for single hop data;
    a tunnel determiner to determine, by the first network device, that the BFD session is over a network tunnel from the first network device to the second network device;
    a session initiator to:
       initiate the BFD session between the first and second network devices, wherein the BFD session is shared between multiple clients requesting BFD sessions on a network tunnel, but is not shared between tunneled and non-tunneled sessions between the multiple clients and initiate no more than one BFD session in memory for each BFD session key whenever multiple protocols are monitoring a same layer 3 network path;

a data transmitter to transmit, the single hop data to the second network device via the network tunnel, wherein the network tunnel traverses a multiple hop network path; and an echo disabler to disable echo packets for the BFD session.

13. The system of claim 12, wherein the first network device is part of a first physical Local Area Network (LAN), the second network device is part of a second physical Local Area Network (LAN) and the a portion of the multiple hop path does not belong to either of the first physical LAN or the second physical LAN.

14. The system of claim 12 comprising:

a domain enforcer to enforce single hop semantics across multiple hop domains.

15. The system of claim 12 comprising:

the data transmitter to transmit a next hop resolution result between the BFD session and a non-tunneled BFD session, the next hope resolution result defining a next hop and an outgoing interface on a network path between the first and second network devices.

16. The system of claim 12 comprising:

the data transmitter to transmit a data packet from the first network device to the second network device over the BFD session to determine that the network tunnel is active.

17. The system of claim 12, wherein the network tunnel is over one of a layer 2 tunnel or a layer 3 tunnel.

* * * * *